US012646671B2

(12) United States Patent
Javora et al.

(10) Patent No.: US 12,646,671 B2
(45) Date of Patent: Jun. 2, 2026

(54) MEDIUM VOLTAGE OR HIGH VOLTAGE CIRCUIT BREAKER

(71) Applicant: ABB Schweiz AG, Baden (CH)

(72) Inventors: Radek Javora, Hrusovany u Brna (CZ); Dietmar Gentsch, Ratingen (DE); Carlo Boffelli, Dalmine (IT); Viktor Wormsbecher, Heiligenhaus (DE)

(73) Assignee: ABB Schweiz AG, Baden (CH)

( * ) Notice: Subject to any disclaimer, the term of this patent is extended or adjusted under 35 U.S.C. 154(b) by 262 days.

(21) Appl. No.: 18/344,999

(22) Filed: Jun. 30, 2023

(65) Prior Publication Data

US 2024/0006137 A1 Jan. 4, 2024

(30) Foreign Application Priority Data

Jul. 1, 2022 (EP) .................................... 22182524

(51) Int. Cl.
*H01H 33/666* (2006.01)
*H01H 33/66* (2006.01)

(52) U.S. Cl.
CPC ...... *H01H 33/666* (2013.01); *H01H 33/6606* (2013.01)

(58) Field of Classification Search
CPC ............. H01H 33/666; H01H 33/6606; H01H 33/664; H01H 33/662; H01H 2033/6665;
(Continued)

(56) References Cited

U.S. PATENT DOCUMENTS 3,582,588 A * 6/1971 Cichocki .............. H01H 33/666 218/7
3,597,556 A * 8/1971 Sharp ....................... H01H 3/46 218/4
(Continued)

FOREIGN PATENT DOCUMENTS

EP 2469561 A1 6/2012
JP 8-264084 A 10/1996
(Continued)

OTHER PUBLICATIONS

Translation of JP2006019193A (Original document published Jan. 19, 2006) (Year: 2006).*
(Continued)

*Primary Examiner* — William A Bolton
(74) *Attorney, Agent, or Firm* — Fitch Even Tabin & Flannery LLP

(57) ABSTRACT

A circuit breaker includes first and second terminals, first and second interrupters, an interconnection part, an actuator, an operating rod, and a lever system. The first terminal is electrically connected to a fixed contact of the first vacuum interrupter. The second terminal is electrically connected to a fixed contact of the second vacuum interrupter. The interconnection part is configured to be in electrical connection with a movable contact of the first vacuum interrupter and the interconnection part is configured to be in electrical connection with a movable contact of the second vacuum interrupter. The interconnection part is configured to provide a current path between the movable contacts. In a transition from an open state to the closed state, the actuator is configured to move the operating rod to move the second end of the first non-linear lever arm and the second end of the second non-linear lever arm.

13 Claims, 9 Drawing Sheets

(58) Field of Classification Search

CPC ............. H01H 2033/6667; H01H 9/52; H01H 2009/523; H01H 2009/526; H01H 2225/008

USPC ................. 218/118, 120, 140, 153, 154, 4–7

See application file for complete search history.

(56) References Cited

U.S. PATENT DOCUMENTS

| | | | | | |
|---|---|---|---|---|---|
| 3,697,819 | A | * | 10/1972 | Eichelberger .......... | H02B 13/02 361/603 |
| 3,728,508 | A | | 4/1973 | Netzel | |
| 3,946,184 | A | * | 3/1976 | Yoshioka ............. | H01H 33/882 218/82 |
| 3,970,810 | A | | 7/1976 | Carroll et al. | |
| 4,087,664 | A | * | 5/1978 | Weston ................ | H01H 33/143 218/3 |
| 4,550,234 | A | * | 10/1985 | Steinemer ............ | H01H 33/666 218/4 |
| 5,668,360 | A | * | 9/1997 | Perret .................... | H01H 33/14 218/7 |
| 8,013,268 | B2 | | 9/2011 | Ozil et al. | |
| 10,957,505 | B2 | * | 3/2021 | Chen ...................... | H01H 33/14 |
| 2013/0057083 | A1 | * | 3/2013 | Donzel ................ | H01H 33/666 218/4 |

FOREIGN PATENT DOCUMENTS

| | | | | | |
|---|---|---|---|---|---|
| JP | 2006019193 | A | * | 1/2006 | ............. H01H 33/66 |
| JP | 2012-69345 | A | | 4/2012 | |

OTHER PUBLICATIONS

Translation of JPH08264084A (Original document published Oct. 11, 1996) (Year: 1996).*

European Patent Office, Extended European Search Report in European Patent Application No. 22182524.3, 7 pp. (Nov. 23, 2022).

Alferov et al., “Dielectric Strength of Two Series Connected Vacuum Interrupters,” *23rd International Symposium on Discharges and Electrical Insulation in Vacuum*, 4 pp. (Sep. 15-19, 2008).

Intellectual Property India, Examination Report in Indian Patent Application No. 202344031721, 8 pp. (Oct. 14, 2025).

* cited by examiner

- PRIOR ART -

VIs disconnected (switched off)

VIs connected (switched on)

MEDIUM VOLTAGE OR HIGH VOLTAGE CIRCUIT BREAKER

CROSS-REFERENCE TO RELATED APPLICATIONS

The instant application claims priority to European Patent Application No. 22182524.3, filed Jul. 1, 2022, which is incorporated herein in its entirety by reference.

FIELD OF THE DISCLOSURE

The present disclosure generally relates to a medium voltage or high voltage circuit breaker, a drive for a medium voltage or high voltage circuit breaker, and a medium voltage or high voltage switchgear.

BACKGROUND OF THE INVENTION

Vacuum interrupters are widely known in the industry, in the applications of low-; medium-; high-voltage circuit breakers. FIG. 1 shows a standard design of a circuit breaker pole. The standard design of the circuit breaker pole has a housing 1, which provides for the proper positioning of internal parts, the upper terminal 2 and the lower terminal 6 provide an interface to the outer environment. The circuit breaker also has a vacuum interrupter (VI) 5 and a pushrod 7 transfers the movement of the actuator 8 into the VI. The VI 5 has one contact fixed contact 3 and one movable contact 4.

Movement of the moveable contact 4 is achieved through the push rod 7. The fixed contact 3 is both mechanically and electrically connected to the upper terminal 2. The moveable contact 4 is in electrical contact with lower contact 6. Mechanical fixation of the moveable contact 4 needs to allow for linear movement of this contact towards the fixed contact 3. The housing 1 is also used for improving the dielectric withstand of the whole interior assembly with respect to the surrounding electrical potentials. It is usually made of thermoplastic, duroplastic and/or thermoset material, which enables decreasing distances to the next phase(s) or grounded switchgear walls and provides for increasing creepage distances.

The success of these devices in medium voltage (MV) field has led to the desire for the extension of their applications towards higher voltage levels as well. Vacuum interrupters designed for higher voltage levels are feasible, but they are expensive, and they are challenging to develop. When a VI is developed for high voltage applications, the resultant design is very bulky and significant design effort is needed to improve heat dissipation from such a bulky unit. This, together with lower production volumes applicable, become critical factors when deciding whether such VIs can be utilized in new developments. Furthermore, high voltage applications require large distance from fixed to moveable contact in the open state, resulting in a long path the pushrod 7 needs to travel and subsequently in a big actuating mechanism 8 that needs to have sufficient power and has to drive the pushrod 7 in a long distance.

BRIEF SUMMARY OF THE INVENTION

The present disclosure describes an improved medium voltage or high voltage circuit breaker. In a first aspect, there is provided a medium voltage or high voltage circuit breaker; comprising:

a first terminal;

a second terminal;

a first vacuum interrupter;

a second vacuum interrupter;

an interconnection part;

an actuator;

an operating rod; and a lever system;

The first terminal is electrically connected to a first fixed contact of the first vacuum interrupter, and the second terminal is electrically connected to a second fixed contact of the second vacuum interrupter. The interconnection part is configured to be in electrical connection with a first movable contact of the first vacuum interrupter and the interconnection part is configured to be in electrical connection with a second movable contact of the second vacuum interrupter. The interconnection part is configured to provide a current path between the first and second movable contacts. A first end of a first non-linear lever arm of the lever system is coupled to a pushrod of the first movable contact of the first vacuum interrupter at a first lever arm first end pivot point, and a second end of the first lever arm is coupled to the operating rod at a center pivot point. A first end of a second non-linear lever arm of the lever system is coupled to a pushrod of the second movable contact of the second vacuum interrupter at a second lever arm first end pivot point, and a second end of the second lever arm is coupled to the operating rod at the center pivot point. A first sliding part at the first end of the first non-linear lever arm is supported by the interconnection part and can slide linearly within a slot of the interconnection part or a first sliding part at the first end of the first non-linear lever arm is supported by the interconnection part and can move linearly with respect to a bearing of the interconnection part. A second sliding part at the first end of the second non-linear lever arm is supported by the interconnection part and can slide linearly within a slot of the interconnection part or a second sliding part at the first end of the second non-linear lever arm is supported by the interconnection part and can move linearly with respect to a bearing of the interconnection part. In a transition from an open state to the closed state the actuator is configured to move the operating rod to move the second end of the first non-linear lever arm and the second end of the second non-linear lever arm such that the part at the first end of the first non-linear lever arm and the part at the first end of the second non-linear lever arm move simultaneously within their corresponding slots away from one another or with respect to their corresponding bearings away from one another.

It is to be noted that reference to an "end" of a non-linear lever arm does not require this to be right at the actual end, but can be towards or near the actual end.

Thus, the second vacuum interrupter is connected in series with the first vacuum interrupter, and in a closed state current can flow from the first terminal to the second terminal when movable contacts of both vacuum interrupters are brought into contact with fixed contacts of both vacuum interrupters. And by using non-linear lever arms of a lever system to drive the movable contacts of the in series vacuum interrupters a compact design is provided, because the movement required by the operating rod is minimized.

BRIEF DESCRIPTION OF THE SEVERAL VIEWS OF THE DRAWING(S)

Figure 3B:
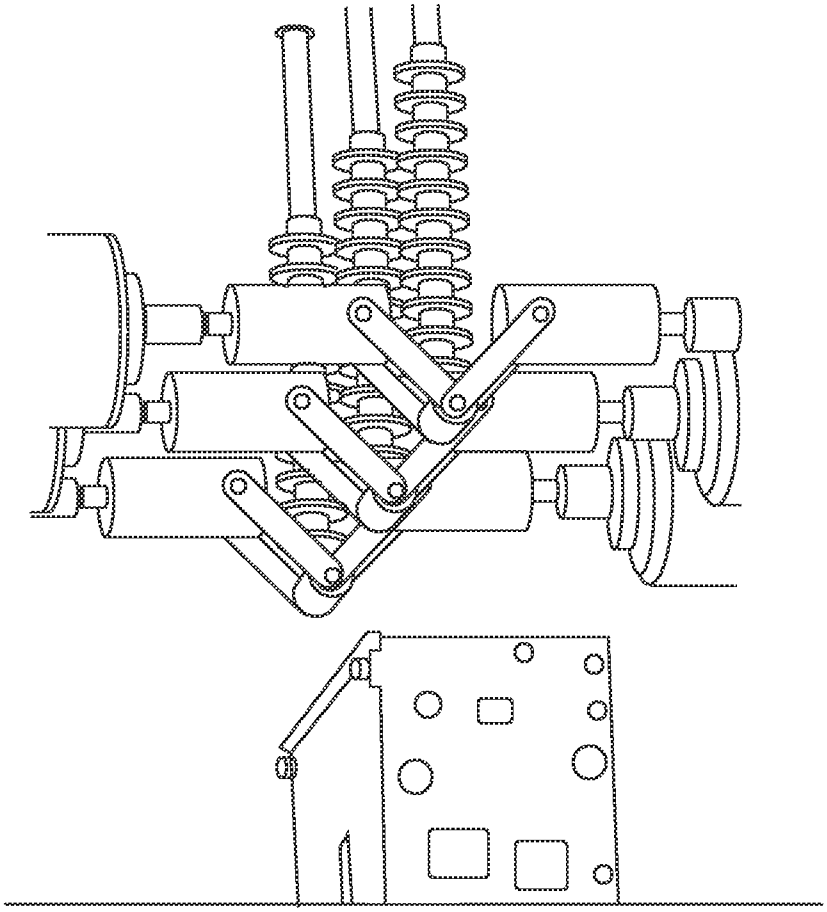
Figure 3A:
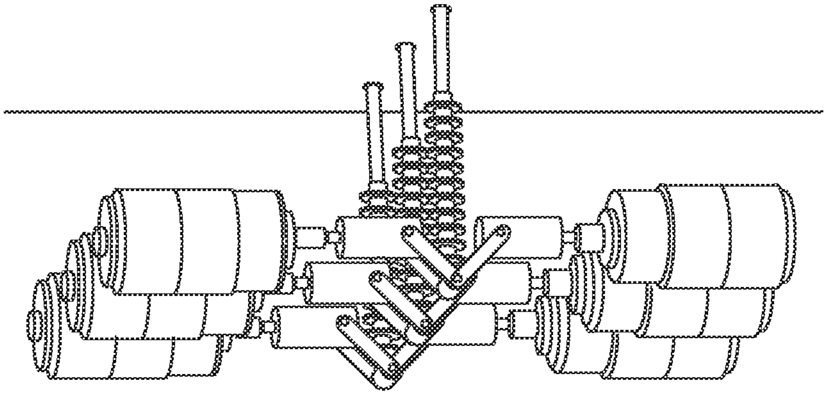

FIGS. 3*a* and 3*b* show an example from different perspectives of a three-phase system using design of a medium voltage or high voltage circuit breaker using linear lever arms in accordance with the disclosure.

Figure 4C:
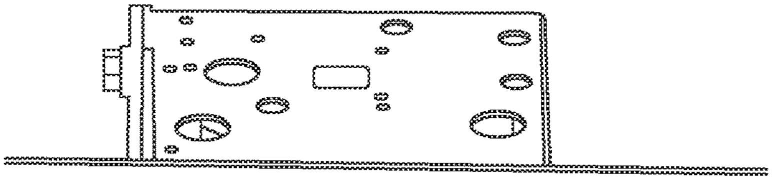
Figure 4B:
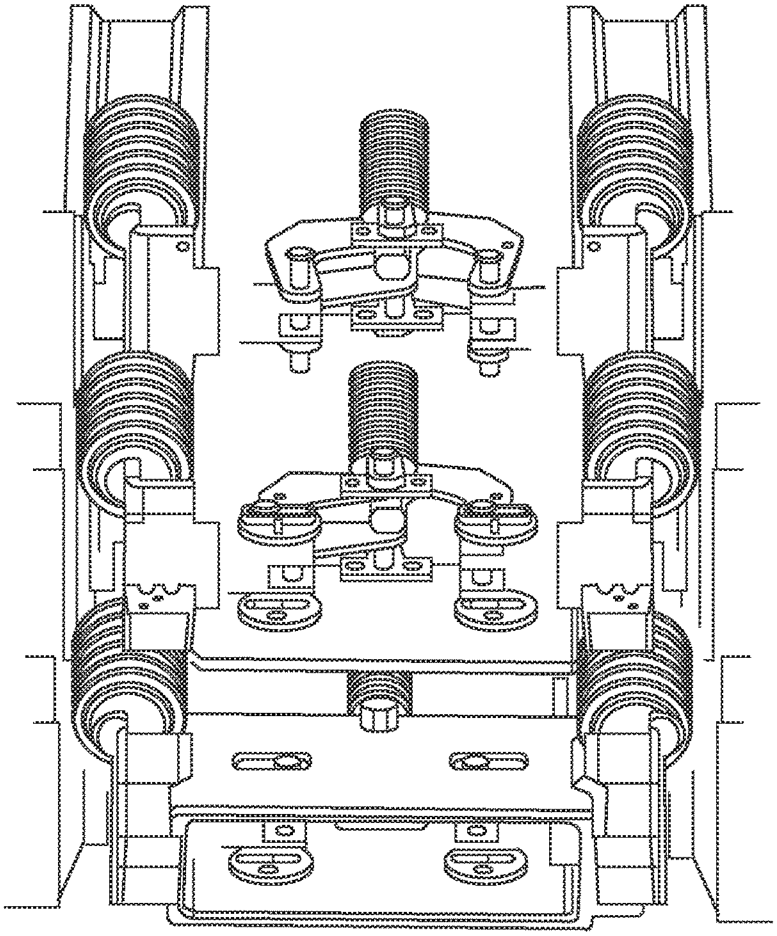
Figure 4A:
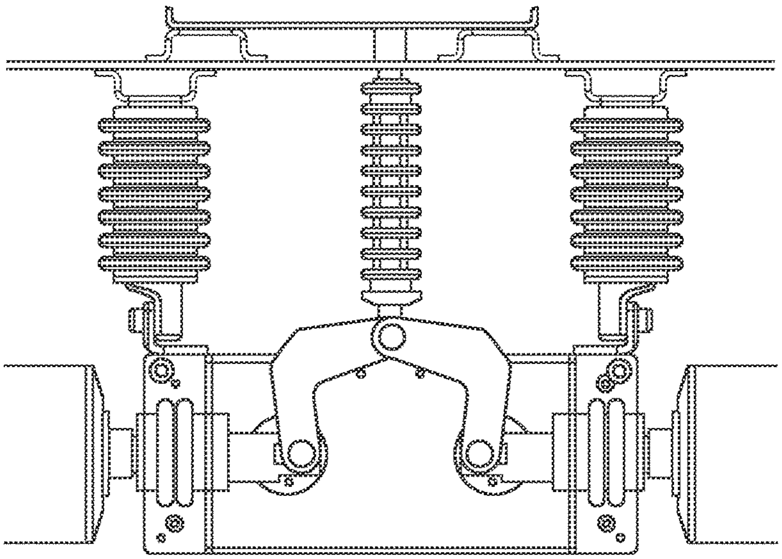
Figure 5B:
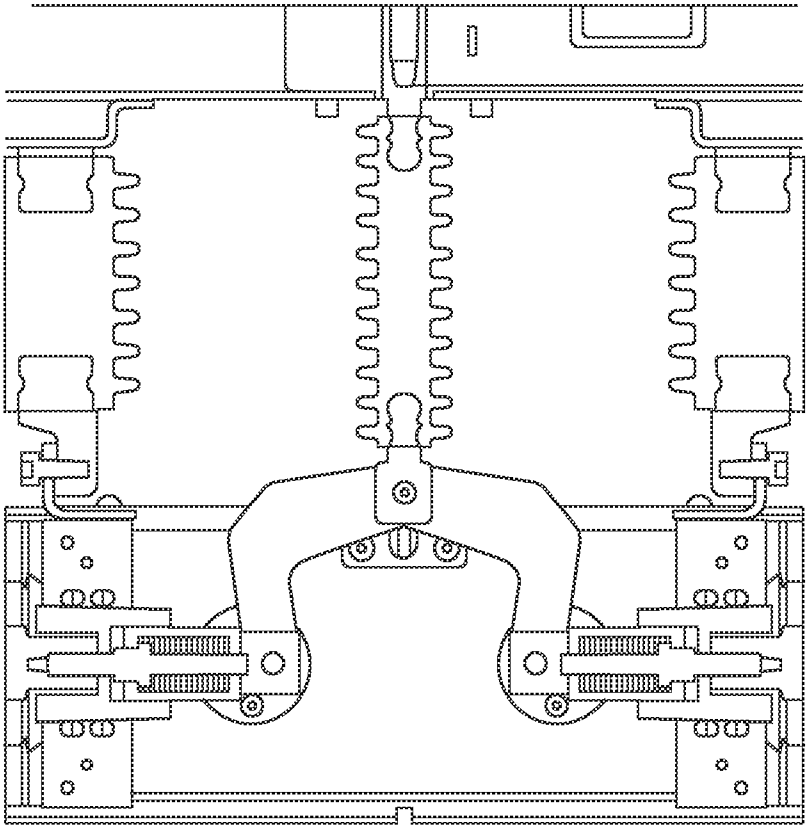
Figure 5A:
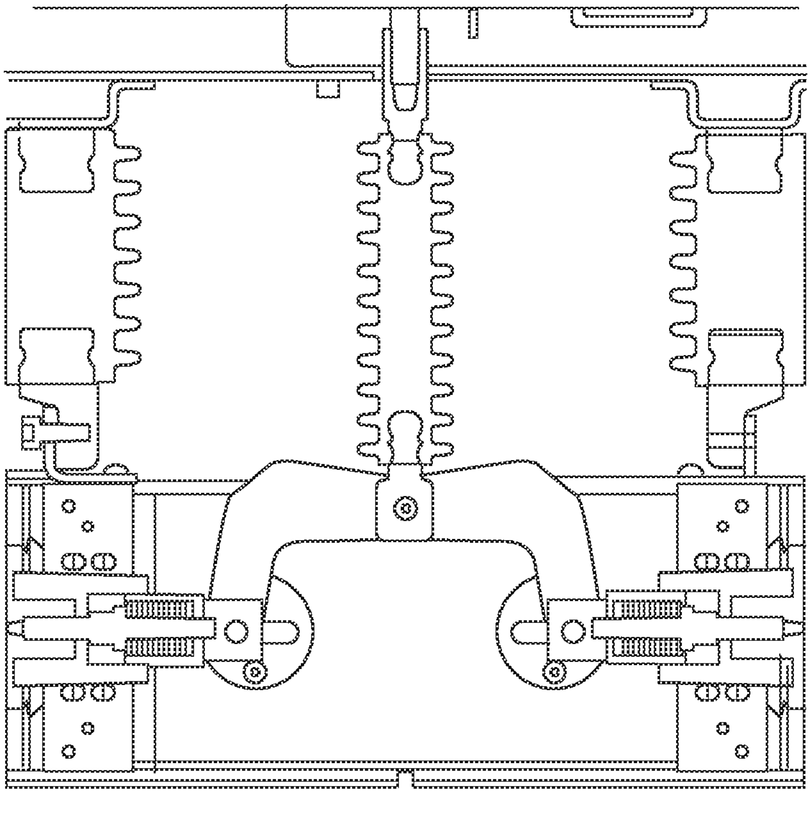
Figure 6D:
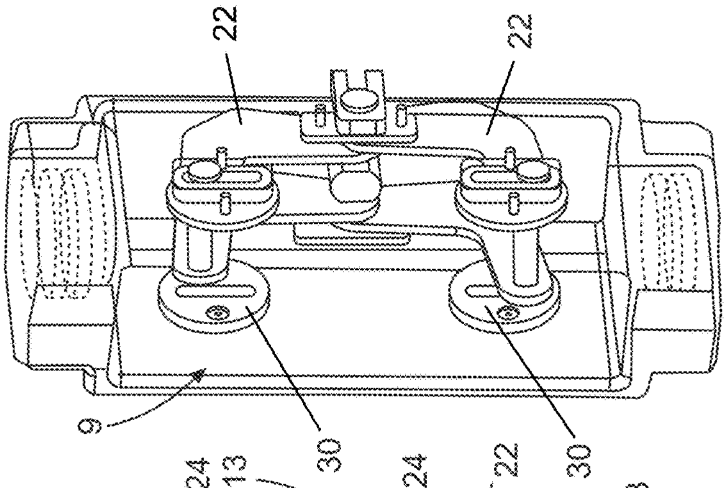
Figure 6C:
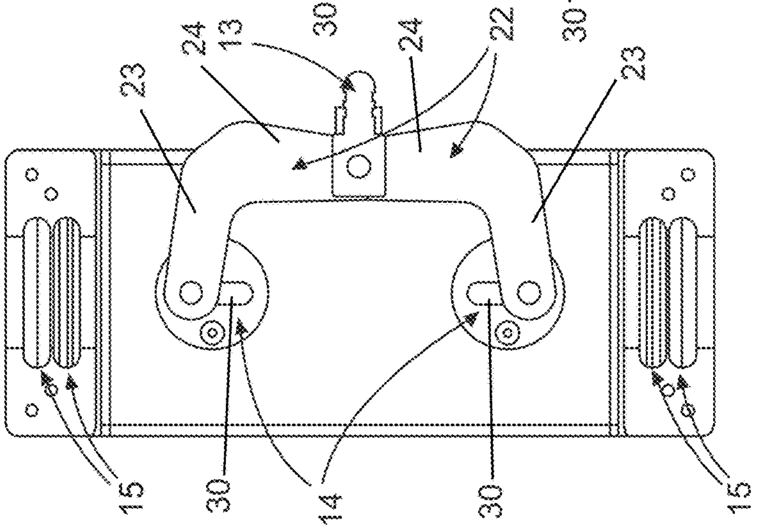
Figure 6B:
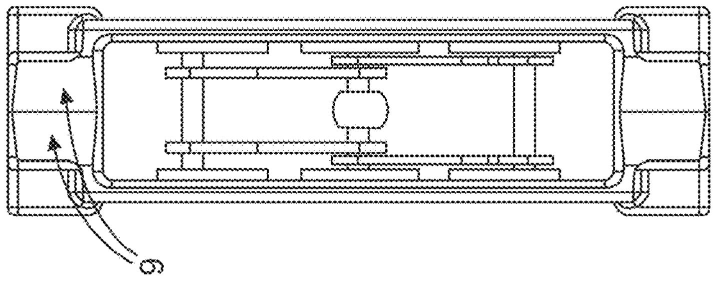
Figure 6A:
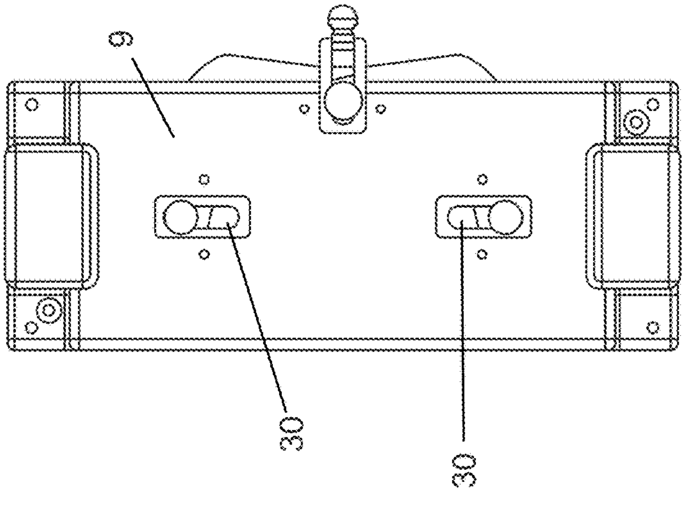

FIGS. 4*a*, 4*b*, and 4*c* show different perspective views of an example of a design of a drive for a medium voltage or high voltage circuit breaker using non-linear lever arms in accordance with the disclosure;

FIGS. 5*a* and 5*b* show different perspectives of an example of a design of a drive for a medium voltage or high voltage circuit breaker using non-linear lever arms in accordance with the disclosure.

FIGS. 6*a*, 6*b*, 6*c*, and 6*d* show different perspectives of an example of a design of a drive for a medium voltage or high voltage circuit breaker using non-linear lever arms and with connections shown to vacuum interrupters at both ends in accordance with the disclosure.

Figure 7A:
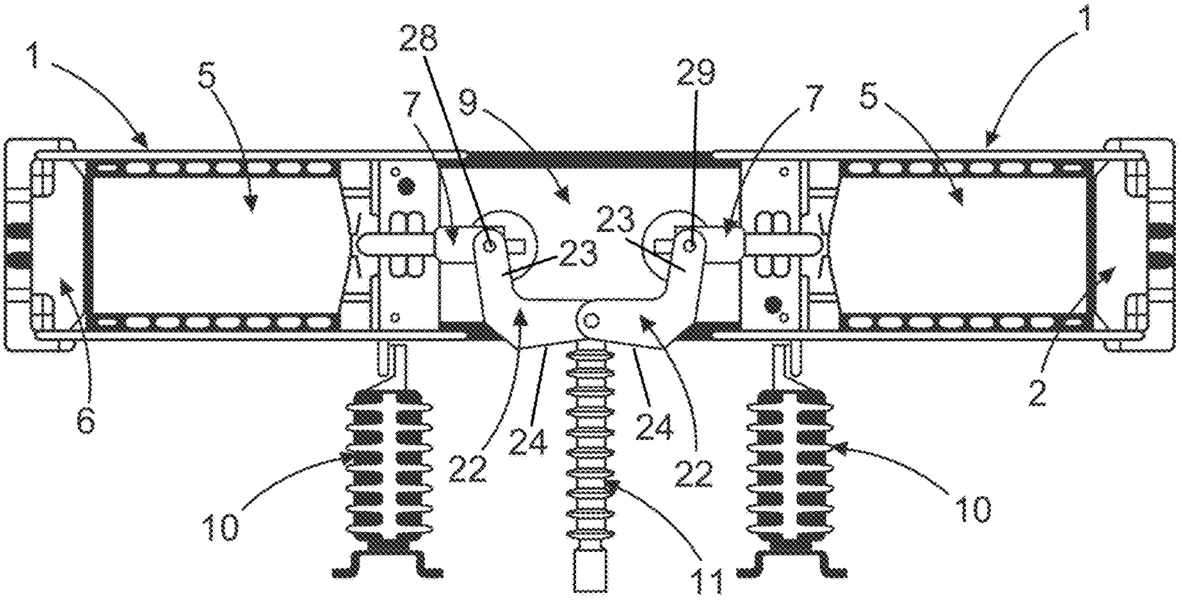
Figure 7B:
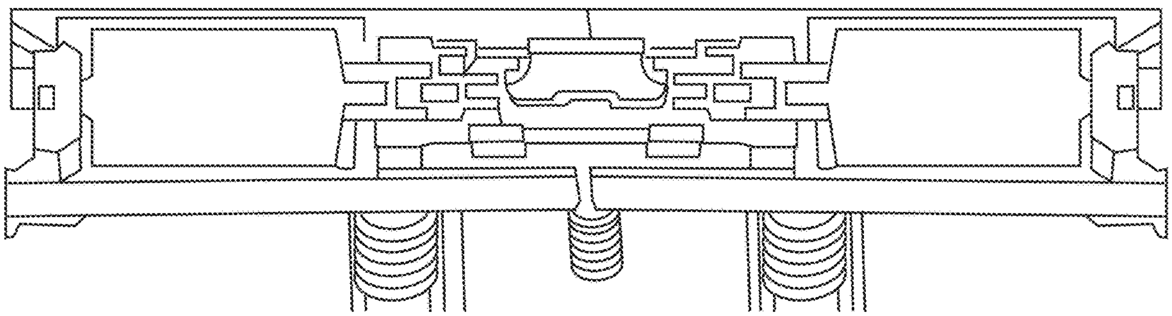

FIGS. 7*a* and 7*b* shows different perspective views of an examples of a new design of a medium voltage or high voltage circuit breaker in accordance with the disclosure.

Figure 8:
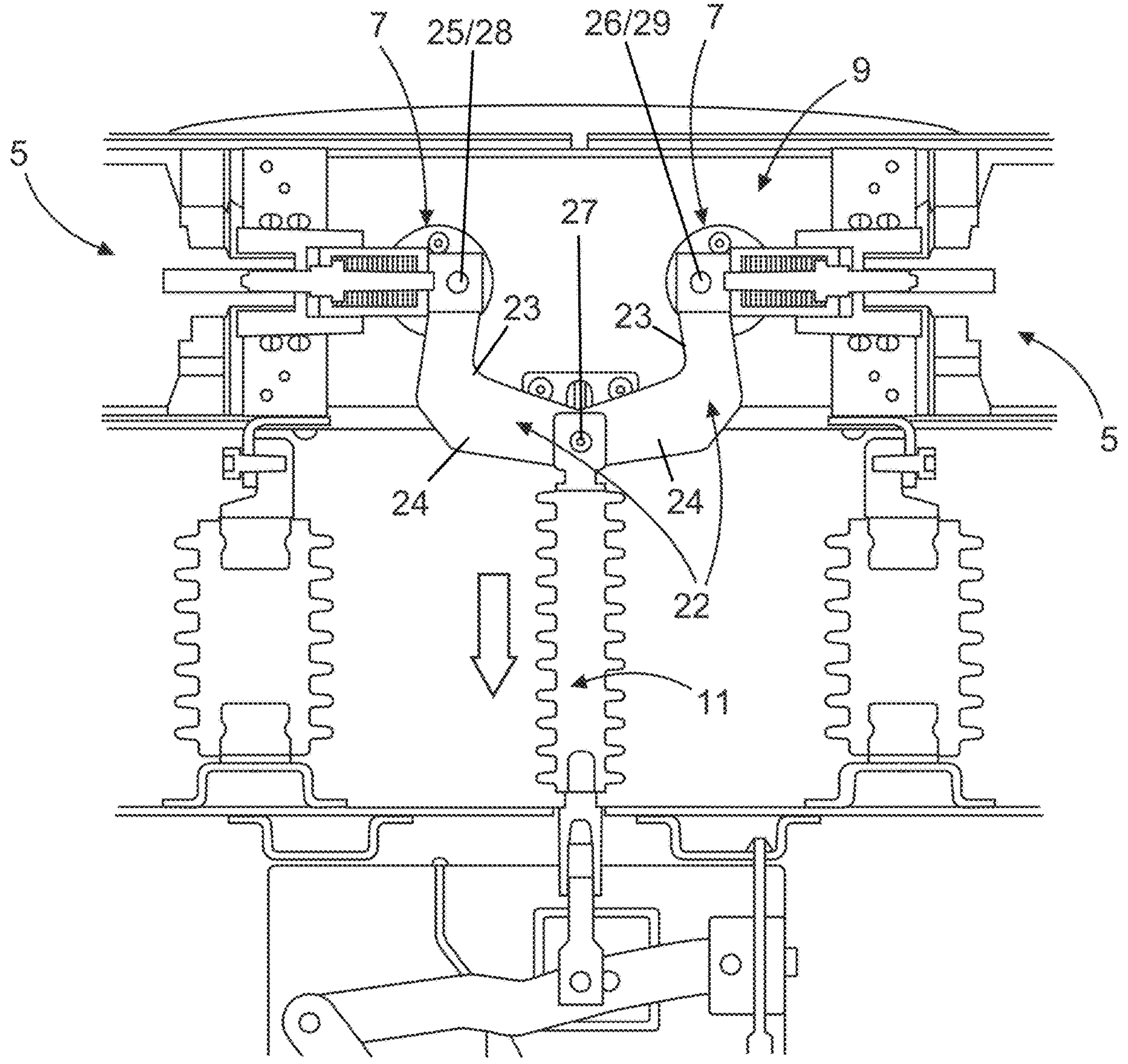

FIG. 8 shows an example of a design of a drive for a medium voltage or high voltage circuit breaker using non-linear lever arms in accordance with the disclosure.

Figure 9:
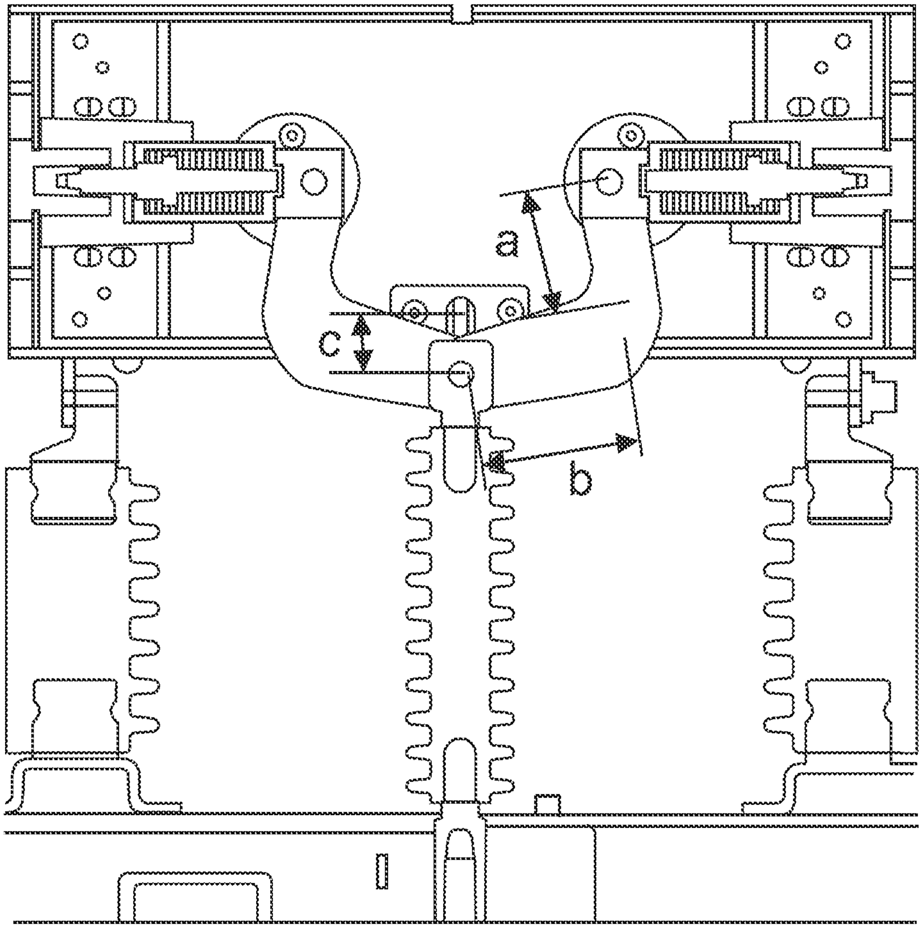

FIG. 9 shows an example of a design of a drive for a medium voltage or high voltage circuit breaker using non-linear lever arms in accordance with the disclosure.

DETAILED DESCRIPTION OF THE INVENTION

A new medium voltage or high voltage circuit breaker is now described along with the new drive for a medium voltage or high voltage circuit breaker. In the following a medium voltage or high voltage circuit breaker is described with two vacuum interrupters in series with an interconnection part, as part of a drive, connecting them. The current new development can be utilized with more than two vacuum interrupters in series, with interconnection parts connecting adjacent vacuum interrupters.

In an example, a medium voltage or high voltage circuit breaker comprises a first terminal 2, a second terminal 6, a first vacuum interrupter 5, a second vacuum interrupter 5, an interconnection part 9, an actuator 8. an operating rod 11, and a lever system 12. The first terminal is electrically connected to a fixed contact 3 of the first vacuum interrupter. The second terminal is electrically connected to a fixed contact 3 of the second vacuum interrupter. The interconnection part is configured to be in electrical connection with a movable contact 4 of the first vacuum interrupter and the interconnection part is configured to be in electrical connection with a movable contact 4 of the second vacuum interrupter, and the interconnection part is configured to provide a current path between the movable contacts. Thus, upon activation the movable contacts of both vacuum interrupters are moved towards the respective fixed contacts until in a closed state the movable contacts are in contact with the fixed contacts. There is then a current path from the first terminal to the second terminal via the first vacuum interrupter, the interconnection part, and the second vacuum interrupter. A first end of a first non-linear lever arm 22 of the lever system is coupled to a pushrod 7 of the movable contact of the first vacuum interrupter at a first lever arm first end pivot point, and a second end of the first lever arm is coupled to the operating rod at a center pivot point. A first end of a second non-linear lever arm 22 of the lever system is coupled to a pushrod 7 of the movable contact of the second vacuum interrupter at a second lever arm first end pivot point, and a second end of the second lever arm is coupled to the operating rod at the center pivot point.

A sliding part at the first end of the first non-linear lever arm is supported by the interconnection part and can slide linearly within a slot of the interconnection part or a sliding part at the first end of the first non-linear lever arm is supported by the interconnection part and can move linearly with respect to a bearing of the interconnection part. A sliding part at the first end of the second non-linear lever arm is supported by the interconnection part and can slide linearly within a slot of the interconnection part or a sliding part at the first end of the second non-linear lever arm is supported by the interconnection part and can move linearly with respect to a bearing of the interconnection part. This is shown clearly in the Figures, where in specific embodiments shown the first and second non-linear lever arms are each actually doubled with an axle going through both sets at one end and attached to the operating rod enabling the first and second non-linear lever arm pairs to rotate with respect to the operating rod. At the other end each pair of the non-linear lever arms has another axle that has ends that go into slots in opposite walls of the interconnection part enabling the ends of the non-linear lever arms to translate upwards and downwards as the non-linear lever arms are angled through the other ends of the lever arms being pulled sideways. The ends of the non-linear lever arms moving upwards and downwards are coupled to the ends movable contacts via pushrods 7, enabling the non-linear lever arms to move the movable contacts towards and away from the fixed contacts simultaneously. The push rod 7, the non-linear lever arms 22 of the lever system 12 and the operating rod 11 can all be of an insulating material (or one of them can be) in order that the actuator 8 is electrically isolated from the movable contacts. In a transition from an open state to the closed state the actuator is configured to move the operating rod to move the second end of the first non-linear lever arm and the second end of the second non-linear lever arm such that the part at the first end of the first non-linear lever arm and the part at the first end of the second non-linear lever arm move simultaneously within their corresponding slots away from one another or with respect to their corresponding bearings away from one another.

In an example, the first vacuum interrupter is identical to the second vacuum interrupter. According to an example, the first non-linear lever arm comprises a first arm part connected to a second arm part, and the first arm part of the first non-linear lever arm is angled to the second arm part of the first non-linear lever arm. An end of the first arm part is the first end of the first non-linear lever arm coupled to the pushrod of the movable contact of the first vacuum interrupter at the first lever arm first end pivot point, and an end of the second arm part is the second end of the first lever arm coupled to the operating rod at the center pivot point. The second non-linear lever arm comprises a first arm part connected to a second arm part, and the first arm part of the second non-linear lever arm is angled to the second arm part of the second non-linear lever arm. An end of the first arm part is the first end of the second non-linear lever arm coupled to the pushrod of the movable contact of the second vacuum interrupter at the second lever arm first end pivot point, and an end of the second arm part is the second end of the second lever arm coupled to the operating rod at the center pivot point.

According to an example, a length (a) of the first arm part of the first non-linear lever arm between the first end pivot point and the connection with the second arm part of the first non-linear lever arm is less than a length (b) of the second arm part of the first non-linear lever arm between the center pivot point and the connection with the first arm part of the first non-linear lever arm. Also, a length (a) of the first arm part of the second non-linear lever arm between the first end pivot point and the connection with the second arm part of the second non-linear lever arm is less than a length (b) of the second arm part of the second non-linear lever arm between the center pivot point and the connection with the first arm part of the second non-linear lever arm.

According to an example, the first arm part of the first non-linear lever arm is angled to the second arm part of the first non-linear lever arm at an obtuse angle, and the first arm part of the second non-linear lever arm is angled to the second arm part of the second non-linear lever arm at an obtuse angle.

According to an example, the first arm part of the first non-linear lever arm is angled to the second arm part of the first non-linear lever arm at an angle substantially equal to 90 degrees, and the first arm part of the second non-linear lever arm is angled to the second arm part of the second non-linear lever arm at an angle substantially equal to 90 degrees.

According to an example, the second non-linear lever arm is a mirror image of the first non-linear lever arm. According to an example, the second non-linear lever arm is not a mirror image of the first non-linear lever arm. According to an example, the first vacuum interrupter is of a different design to the second vacuum interrupter.

In an example, the part at the first end of the first non-linear lever arm and the part at the first end of the second non-linear lever arm move simultaneously within their corresponding slots away from one another over the same distance or with respect to their corresponding bearings away from one another over the same distance.

Thus, the ends of the non-linear lever arms can move within slots as shown in the figures, however the ends can move with respect to or in bearings or similar that are integrated into the interconnection part, which can lead to a reduction in friction with respect to movement in a slot.

In an example, the part at the first end of the first non-linear lever arm and the part at the first end of the second non-linear lever arm move simultaneously within their corresponding slots away from one another over a different distance or with respect to their corresponding bearings away from one another over the different distance.

In an example, the part at the first end of the first non-linear lever arm and the part at the first end of the second non-linear lever arm move simultaneously within their corresponding slots away from one another at different velocities or with respect to their corresponding bearings away from one another over at different velocities.

Thus, the ends of the non-linear lever arms can move within slots or with respect to bearings or similar that are integrated into the interconnection part, to move the movable contacts over different distances to obtain different final gaps between the movable and fixed contacts for each vacuum interrupter and move the contacts at different velocities.

According to an example, the interconnection part is configured to be in electrical connection with the movable contact of the first vacuum interrupter and the interconnection part is configured to be in electrical connection with the movable contact of the second vacuum interrupter during at least part of the transition from the open state to the closed state.

As shown in FIG. 6, this can be provided via "sliding" current carrying elements 15, such as a spiral contact or multilamellar, or contact band that can be fixed between the movable stem of the movable contact and the interconnection part 9. Thus, a drive rod of a movable contact 4, that is coupled to a push rod 7, can slide within the sliding current carrying elements 15 and there is an electrical connection from the stem of the movable contact 4 to the interconnection part 9. The electrical connection can be always established, such that the movable contact is always in electrical connection with the interconnection part, but it can be only in electrical connection towards the end of its drive as it approaches the fixed contact and when it is in contact with the fixed contact.

In an example, the interconnection part is configured to be in electrical connection with the movable contact of the first vacuum interrupter and the interconnection part is configured to be in electrical connection with the movable contact of the second vacuum interrupter.

According to an example, in a transition from the closed state to the open state the actuator is configured to move the operating rod to move the second end of the first non-linear lever arm and the second end of the second non-linear lever arm such that the part at the first end of the first non-linear lever arm and the part at the first end of the second non-linear lever arm move simultaneously within their corresponding slots towards one another or with respect to their corresponding bearings towards one another.

In an example, the part at the first end of the first non-linear lever arm and the part at the first end of the second non-linear lever arm move simultaneously within their corresponding slots towards one another over the same distance or with respect to their corresponding bearings towards one another over the same distance.

In an example, the interconnection part is configured to be in electrical connection with the movable contact of the first vacuum interrupter and the interconnection part is configured to be in electrical connection with the movable contact of the second vacuum interrupter during at least part of the transition from the closed state to the open state.

In an example, the current path between the movable contacts is provided by at least one wall of the interconnection part. In an example, one or more of the at least one wall of the interconnection part comprises ribs on the inner side and/or on the outer side. In an example, the interconnection part is open on a first side. In an example, the interconnection part is open on a second side opposite to the first side. In an example, a mounting between the actuator and the housing comprises at least one supporting and insulating mean 10. A medium voltage or high voltage switchgear can comprise one or more of such a circuit breaker as described above.

An exemplar drive for a medium voltage or high voltage circuit breaker is now described. To better understand the drive, the circuit breaker is first described. The circuit breaker comprises a first terminal 2, a second terminal 6, a first vacuum interrupter 5, a second vacuum interrupter 5, here the first terminal is electrically connected to a fixed contact 3 of the first vacuum interrupter, and the second terminal is electrically connected to a fixed contact 3 of the second vacuum interrupter. The drive itself comprises an interconnection part 9, an actuator 8, an operating rod 11, and a lever system 12. The interconnection part is configured to be in electrical connection with a movable contact 4 of the first vacuum interrupter and the interconnection part is configured to be in electrical connection with a movable contact 4 of the second vacuum interrupter, and the interconnection part is configured to provide a current path between the movable contacts. A first end 23 of a first non-linear lever arm 22 of the lever system is configured to couple to a pushrod 7 of the movable contact of the first vacuum interrupter at a first lever arm first end pivot point 25, and a second end 24 of the first lever arm is coupled to the operating rod at a center pivot point 27. A first end 23 of a second non-linear lever arm 22 of the lever system is configured to couple to a pushrod 7 of the movable contact of the second vacuum interrupter at a second lever arm first end pivot point 26, and a second end 24 of the second lever arm is coupled to the operating rod at the center pivot point 27.

A first sliding part 28 at the first end 23 of the first non-linear lever arm is supported by the interconnection part and can slide linearly within a slot 30 of the interconnection part or a first sliding part 28 at the first end 23 of the first non-linear lever arm is supported by the interconnection part and can move linearly with respect to a bearing of the interconnection part. A second sliding part 29 at the first end 23 of the second non-linear lever arm is supported by the interconnection part and can slide linearly within a slot 30 of the interconnection part or a second sliding part 29 at the first end 23 of the second non-linear lever arm is supported by the interconnection part and can move linearly with respect to a bearing of the interconnection part. In a first transition the actuator is configured to move the operating rod in a first direction to move the second end 24 of the first lever arm and the second end 24 of the second lever arm such that the first sliding part 28 at the first end 23 of the first lever arm and the second sliding part 29 at the first end 23 of the second lever arm move simultaneously within their corresponding slots 30 away from one another. In a second transition the actuator is configured to move the operating rod in a second direction opposite to the first direction to move the second end 24 of the first non-linear lever arm and the second end 24 of the second non-linear lever arm such that the first sliding part 28 at the first end 23 of the first non-linear lever arm and the second sliding part 29 at the first end 23 of the second non-linear lever arm move simultaneously within their corresponding slots 30 towards one another or with respect to their corresponding bearings away from one another.

In an example, the first vacuum interrupter is identical to the second vacuum interrupter. According to an example, the first non-linear lever arm comprises a first arm part connected to a second arm part, and the first arm part of the first non-linear lever arm is angled to the second arm part of the first non-linear lever arm. An end of the first arm part is the first end of the first non-linear lever arm coupled to the pushrod of the movable contact of the first vacuum interrupter at the first lever arm first end pivot point, and an end of the second arm part is the second end of the first lever arm coupled to the operating rod at the center pivot point. The second non-linear lever arm comprises a first arm part connected to a second arm part, and the first arm part of the second non-linear lever arm is angled to the second arm part of the second non-linear lever arm. An end of the first arm part is the first end of the second non-linear lever arm coupled to the pushrod of the movable contact of the second vacuum interrupter at the second lever arm first end pivot point, and an end of the second arm part is the second end of the second lever arm coupled to the operating rod at the center pivot point.

According to an example, a length (a) of the first arm part of the first non-linear lever arm between the first end pivot point and the connection with the second arm part of the first non-linear lever arm is less than a length (b) of the second arm part of the first non-linear lever arm between the center pivot point and the connection with the first arm part of the first non-linear lever arm. Also, a length (a) of the first arm part of the second non-linear lever arm between the first end pivot point and the connection with the second arm part of the second non-linear lever arm is less than a length (b) of the second arm part of the second non-linear lever arm between the center pivot point and the connection with the first arm part of the second non-linear lever arm.

According to an example, the first arm part of the first non-linear lever arm is angled to the second arm part of the first non-linear lever arm at an obtuse angle, and the first arm part of the second non-linear lever arm is angled to the second arm part of the second non-linear lever arm at an obtuse angle.

According to an example, the first arm part of the first non-linear lever arm is angled to the second arm part of the first non-linear lever arm at an angle substantially equal to 90 degrees, and the first arm part of the second non-linear lever arm is angled to the second arm part of the second non-linear lever arm at an angle substantially equal to 90 degrees.

It is to be noted that the non-linear lever arms could be in the form of a triangular-like shape, where the sides of the triangle are of different lengths (a and b). This can provide for extra robustness, with the functionality of such triangle-like "levers" equivalent to that discussed for the non-linear lever arms.

According to an example, the second non-linear lever arm is a mirror image of the first non-linear lever arm. According to an example, the second non-linear lever arm is not a mirror image of the first non-linear lever arm.

In an example, the first sliding part at the first end of the first non-linear lever arm and the second sliding part at the first end of the second non-linear lever arm move simultaneously within their corresponding slots away from one another over the same distance or with respect to their corresponding bearings away from one another over the same distance.

In an example, the first sliding part at the first end of the first non-linear lever arm and the second sliding part at the first end of the second non-linear lever arm move simultaneously within their corresponding slots away from one another over a different distance or with respect to their corresponding bearings away from one another over the different distance.

In an example, the first sliding part at the first end of the first non-linear lever arm and the second sliding part at the first end of the second non-linear lever arm move simultaneously within their corresponding slots away from one another at different velocities or with respect to their corresponding bearings away from one another over at different velocities.

In an example, the interconnection part is configured to be in electrical connection with the movable contact of the first vacuum interrupter and the interconnection part is configured to be in electrical connection with the movable contact of the second vacuum interrupter during at least part of the transition from the open state to the closed state.

In an example, the part at the first end of the first non-linear lever arm and the part at the first end of the second non-linear lever arm move simultaneously within their corresponding slots towards one another over the same distance or with respect to their corresponding bearings towards one another over the same distance.

In an example, the interconnection part is configured to be in electrical connection with the movable contact of the first vacuum interrupter and the interconnection part is configured to be in electrical connection with the movable contact of the second vacuum interrupter during at least part of the transition from the closed state to the open state.

In an example, interconnection part is configured such that the current path between the movable contacts is provided by at least one wall of the interconnection part.

In an example, one or more of the at least one wall of the interconnection part comprises ribs on the inner side and/or on the outer side. In an example, the interconnection part is open on a first side. In an example, the interconnection part is open on a second side opposite to the first side.

The above drive can be coupled with two vacuum interrupters as a circuit breaker is first being manufactured. However, it is possible to customize two existing vacuum interrupters with such a connecting drive positioned in series with the vacuum interrupters, to both drive the movable contacts simultaneously and provide a current path through the entire system in a closed state.

Figure 2:
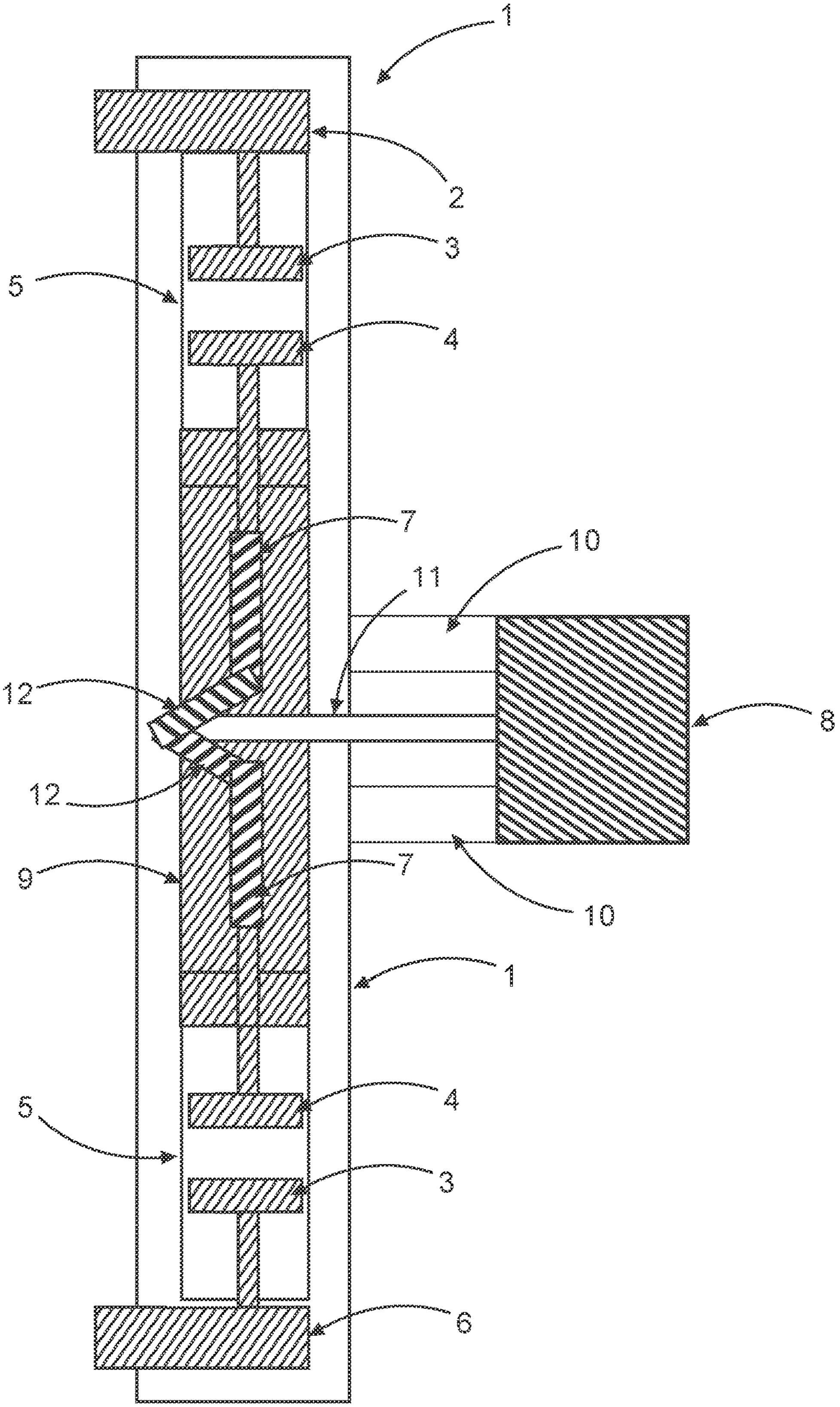
FIG. 2 shows an example of a design of a medium voltage or high voltage circuit breaker using linear lever arms in accordance with the disclosure.

The new medium voltage or high voltage circuit breaker and the new drive for a medium voltage or high voltage circuit breaker are now described in specific detail, where reference is made to FIGS. 2-9. It is to be noted, that for reasons of simplicity of representation FIGS. 2 and 3*a*-3*b* show a lever system (of the new drive) with linear lever arms, with FIGS. 4*a*-9 showing a lever system (of the new drive) with non-linear lever arms 22.

Figure 1:
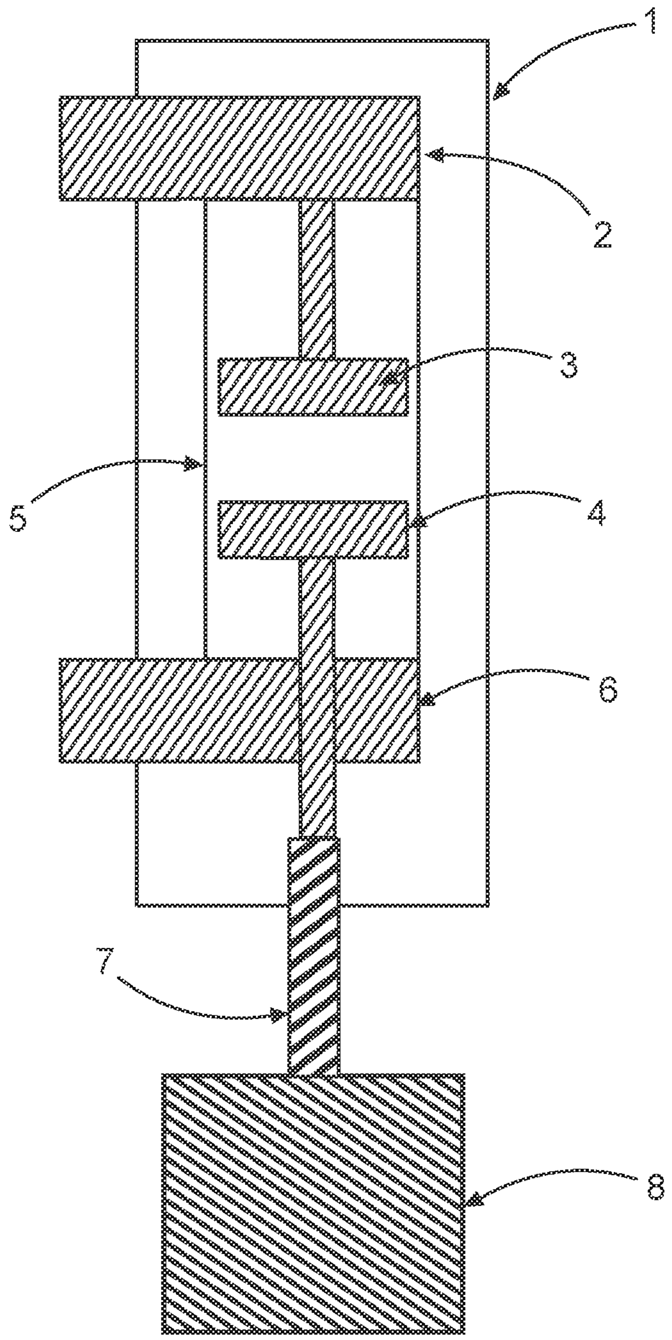
FIG. 1 shows an example of a standard design of a single-phase circuit breaker in accordance with the prior art.

In comparison to a single vacuum interrupter structure shown in FIG. 1, the new double vacuum interrupter circuit breaker design can use two identical vacuum interrupters 5, that interconnect their current carrying parts through a specific part 9 called an interconnection part. The vacuum interrupters, together with their terminals and housing can also be termed poles. Mechanical fixation of all the other parts of both poles within the switchgear or other tanks, can be either done by adaptation of their housing 1, by fixing at the upper terminal 2 and lower terminal 6 or preferably both, i.e., housing as well as terminal fixation.

Depending on a specific actuator 8 and/or pushrod 7 design, the housing 1 may need to be supported by some supporting and insulating means 10, to withstand the mechanical loads originating from the actuator 8 as well as to provide sufficient insulating distance between terminals and grounded parts of the actuator 8 or surrounding parts.

Connection of the operating rod 11 driven by an actuator is translated by the non-linear levers 22 of a lever system 12 into the movement of pushrods 7, that are moving the movable contacts 4 of the vacuum interrupters 5. The lever system 12 has identical first and second non-linear lever arms 22 that are each attached to the operating rod at one end 24 and at the other end 23 the respective lever arms are couple to the movable contacts 4 via respective push rods 7. Here identical actual means that they are mirror images of each other.

The two identical VIs 5 can both be designed for nearly half rated voltage compared to a single vacuum interrupter design, but with the same short circuit interruption current performance as a single vacuum interrupter deign. Therefore, the advantage of such a structure is, that series combination of two existing vacuum interrupters can be used for a double voltage level, without the necessity to utilize one higher voltage vacuum interrupter, what could require to design a new single vacuum interrupter for a particular rated voltage level.

Another advantage of the double vacuum interrupter structure is that the distance between the fixed and the movable contacts of the vacuum interrupters can be half in each vacuum interrupter, compared to a distance needed in the situation of a single vacuum interrupter concept. Therefore, considering the same actuator design used in both cases, the opening speed for the two vacuum interrupter design will be much faster because of two gaps will open at the same time with same speed.

By having non-linear lever arms 22 rather than linear lever arms, a rotation of the non-linear lever arm as it is pushed or pulled by the operating rod leads to an increased linear translation of the end of the non-linear lever arm in its slot, and to an increased movement of the movable contacts. Thus, the operating rod 11 does not need to be moved so far, as regards if the lever arms were linear, and the operating rod can be shorter. Also, the design of the non-linear levers not only decreases the distance required for the operating rod to move between open and closed position of the vacuum interrupters (VIs), but they create non-linearity of the switching force needed for optimum VIs switching.

The interconnecting part 9 interconnecting the two vacuum interrupters can be created out of two identical or similar blocks made from metal, that can carry the current flow through both vacuum interrupters arranged in series as well as provide mechanical support to the mechanism operating the push rod. At the same time, such construction enables better heat dissipation through its opening on two sides, see FIG. 6 and transfer the current from the middle connection between both the vacuum interrupters. This design in shown clearly in FIG. 6, where each block of the interconnecting part 9 in effect has a side wall with two slots 30 in, which can be mechanical reinforced by a suitable means 14. The interconnecting block when constructed is open on both sides, enabling cooling air flow and on one of the open sides the operating rod 11 enters the interconnection part 9 and is couple to the non-linear levers 22 of the lever system 12. One end of the non-linear levers are then pushed and pulled by the operating rod 11 as it translates sideways, for example when it is rotated by the actuator 8 and passes through a threaded bearing and the other ends of the non-linear levers 22 of the lever system 12 slide within the slots 30 perpendicularly to the translation of the operating rod 11.

Thus, the interconnection part 9 can consist of two identical halves mated together. Its main functionality is to ensure proper electrical connection of the two vacuum interrupters connected in series as the whole current is flowing through both half parts. The side walls of the interconnection part 9 and its top and bottom structures provides a large surface area in the design of interconnection part 9, which enables very good heat dissipation and can be designed in addition as heat sink with ribs on the inner and/or outer side, or a suitable surface roughness, or pins, or holes for air flow or all of these. Furthermore, two half designs create an opening on the operating rod side as well as on the opposite side and therefore enables good air or gas flow through this connection, further improving the above-mentioned heat dissipation for example energy can be transferred away from the circuit breaker under current load.

As shown in the FIGS. 4*a*-9, the double VI design can use a symmetrical/mirrored arrangement of the two VIs 5 and were non-linear levers 22 used are also identical in shape and positioned in a symmetrical arrangement as well. In the designs shown the direction of force on the operating rod 11, i.e., the rod 11 is pushed to close the VIs 5 and pulled to open them. However, if the non-linear lever arms 22 of the lever system 12 were arranged facing in the opposite direction, it can be arranged that the rod is pushed to open the VIs and pulled to close the Vis.

FIGS. 4*a*, 4*b*, and 4*c* shows a cross section of one drive, and a 3D view of three drives of for example a three-phase system, with FIGS. 5*a* and 5*b* showing the drive in VIs connected (switched on) and VIs disconnected (switched off) states.

As detailed above, FIGS. 6*a*, 6*b*, 6*c*, and 6*d* show non-linear levers 22 of a lever system 12, that translates or transforms movement of the operating rod 11 to the pushrods 7, providing necessary mechanical force, and adjusting the length of the movement which the pushrods need to take for proper on and off movement of vacuum interrupter contacts. As the identical (mirrored) non-linear levers of the lever system 12 are connected to each vacuum interrupter 5 via the pushrod 7, simultaneous operation of both vacuum interrupters 5 is ensured. This is of importance for successful interruption. Both non-linear levers 22 of the operating system 12 are then connected to the operating rod 11 at the connection point/part 13. As detailed above, when we discuss both non-linear levers this refers to a non-linear lever driving the movable contact of one vacuum interrupter and one non-linear lever driving the movable contact of the other vacuum interrupter, but in fact each of these driving non-linear levers can be in the form of a pair of non-linear levers. The interconnection part 9 serves at the same time as a mechanical structure for the operating mechanism (non-linear levers). As the interconnection part 9 may not have sufficient mechanical strength on top of its electrical properties, additional mechanical reinforcement 14 (e.g., sliding bearing) parts might be necessary, but only in places of highest mechanical load or expected friction, i.e., in the closing or opening operation where the levers 12 are moving.

The embodiment shown in FIGS. 6*a*, 6*b*, 6*c*, and 6*d* shows a specific “knee” or “elbow” shape design of the non-linear lever 22, that helps translating movement of the operating rod 11 to the pushrod 7, providing the necessary mechanical force and adjusting the length of the movement which the pushrods need to take for proper switching of VI contacts. As the same non-linear levers 22 are connected to each VI 5 and pushrod 7, simultaneous operation of both VIs 5 is ensured. Both non-linear levers 22 are then connected to the operating rod 11 at the connection point/part 13—also termed the center connection point.

As detailed above, the interconnection part 9 can be built from two blocks, which can also be termed half shells. It is to be noted that each separate half shell construction enables easy insertion of parts separately and thus ensures a smooth assembly process during production of the pole.

FIGS. 7*a* and 7*b* is show a cross-section and 3D representation respectively of an assembly design of the interconnection part 9 together with two VIs 5, pushrods 7, non-linear levers 22, operating rod 11 and their housing 1 as well as supporting insulators 10.

In more details, FIGS. 7*a* and 7*b* show a pole assembly design of the interconnection part 9 together with two vacuum interrupters 5, pushrods 7, non-linear levers 22 of the lever system 12, operating rod 11 from the actuator 8 and their housing 1. The housing 1 can also be constructed using the half shell principle as for the interconnection part 9, making the whole assembly very modular. A feature of this design is the fact that the housing shells 1 cover, at least partly, the interconnection part 9, and this helps increase the dielectric performance and further strengthens the mechanical robustness of the full assembly. A best dielectric performance can be achieved when the two housing shells 1 on each side are overlapping or connected (not shown in FIGS. 7*a* and 7*b*), to provide maximum dielectric coverage of the interconnection part 9 having full electric potential in case the two vacuum interrupters 5 are moved to an on position.

An advantage is provided by the entire mechanical chain, because the push mechanical operation will be transferred to close the breaker. The non-linear mechanical chain leads to less space needed in the shown “elbow”/“knee” arrangement, where the stroke of the operating rod 11 is smaller to move both the pushrods 7 in closed- or open-position. The character of such an arrangement needs some forces to keep the contacts (and pushrod) in the closed position. That will be different in case the construction of the elbow/knee design will be used according to what is shown in FIG. 7. Here the forces are kept inside the elbow/knee in the closed position, and a permanent force from the operating rod is no longer needed.

FIG. 8 shows a cross section of the nonlinear mechanical movement of the drive assembly, showing movement of the operating rod 11 to move both push rods 7 of the movable contact of both vacuum interrupters inwards simultaneously.

FIG. 9 shows the relationships between the dimensions of the non-linear lever design. To provide the biggest benefit from such a construction of the lever and decrease distance (c), which the operating rod needs to move, the dimension (a) is made smaller than the dimension (b). Thus, the elbow/knee design enables that the needed stroke movement (c) of the operating rod 11 is shorter compared to that that would be necessary using linear levers, providing for a compact in-series dual VI design that also enables the contacts to be kept in place with a reduction in force and even with no force being required.

The description above has centered on the example of identical VIs 5, and with mirror image non-linear lever arms 22. However, the VIs can be different, and the lever arms can be different to each other. Thus, during opening a gap between contacts of the first VI can be opened at a lower velocity than a gap between contacts of the second VI and the final gap between contacts can be different between the contacts of the two VIs. This enables that a smaller gap distance can be used for obtaining a good arc control at contact gap distance of for example up to 25-30 mm and the other contact gap distance can for example be up to 50 mm.

Also, with such an asymmetrical design there exists the opportunity to use the one vacuum interrupter gap which will take a higher voltage withstand, where here the VI with the higher gap distance will be placed. This can be done based on the natural asymmetry of the voltage share between both the VI’s.

Additionally, there also exists the opportunity to place on the higher gap side a vacuum interrupter equipped with AMF contact type and on the one with the smaller gap a vacuum interrupter equipped with TMF contact type.

By using a different and nonlinear mechanical movement of both the contact gaps, with for example contacts of different contact types (AMF/TMF) enables a maximization of performance of current control, whilst avoiding contact deterioration.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In an example, the first non-linear lever arm comprises a first arm part connected to a second arm part. The first arm part of the first non-linear lever arm is angled to the second arm part of the first non-linear lever arm. An end of the first arm part is the first end of the first non-linear lever arm coupled to the pushrod of the movable contact of the first vacuum interrupter at the first lever arm first end pivot point. An end of the second arm part is the second end of the first lever arm coupled to the operating rod at the center pivot point.

In an example, the second non-linear lever arm comprises a first arm part connected to a second arm part. The first arm part of the second non-linear lever arm is angled to the second arm part of the second non-linear lever arm. An end of the first arm part is the first end of the second non-linear lever arm coupled to the pushrod of the movable contact of the second vacuum interrupter at the second lever arm first end pivot point. An end of the second arm part is the second end of the second lever arm coupled to the operating rod at the center pivot point.

In an example, a length of the first arm part of the first non-linear lever arm between the first end pivot point and the connection with the second arm part of the first non-linear lever arm is less than a length of the second arm part of the first non-linear lever arm between the center pivot point and the connection with the first arm part of the first non-linear lever arm.

In an example, a length of the first arm part of the second non-linear lever arm between the first end pivot point and the connection with the second arm part of the second non-linear lever arm is less than a length of the second arm part of the second non-linear lever arm between the center pivot point and the connection with the first arm part of the second non-linear lever arm.

In an example, the first arm part of the first non-linear lever arm is angled to the second arm part of the first non-linear lever arm at an obtuse angle. In an example, the first arm part of the second non-linear lever arm is angled to the second arm part of the second non-linear lever arm at an obtuse angle. In an example, the first arm part of the first non-linear lever arm is angled to the second arm part of the first non-linear lever arm at an angle substantially equal to 90 degrees. In an example, the first arm part of the second non-linear lever arm is angled to the second arm part of the second non-linear lever arm at an angle substantially equal to 90 degrees. In an example, the second non-linear lever arm is a mirror image of the first non-linear lever arm. In an example, the second non-linear lever arm is not a mirror image of the first non-linear lever arm. In an example, the first vacuum interrupter is of a different design to the second vacuum interrupter.

In an example, the interconnection part is configured to be in electrical connection with the movable contact of the first vacuum interrupter and the interconnection part is configured to be in electrical connection with the movable contact of the second vacuum interrupter during at least part of the transition from the open state to the closed state.

In an example, in a transition from the closed state to the open state the actuator is configured to move the operating rod to move the second end of the first non-linear lever arm and the second end of the second non-linear lever arm such that the first sliding part at the first end of the first non-linear lever arm and the second sliding part at the first end of the second non-linear lever arm move simultaneously within their corresponding slots towards one another or with respect to their corresponding bearings towards one another.

In a second aspect, there is provided a drive for a medium voltage or high voltage circuit breaker. The circuit breaker comprises a first terminal, a second terminal, a first vacuum interrupter, a second vacuum interrupter. The first terminal is electrically connected to a fixed contact of the first vacuum interrupter, and the second terminal is electrically connected to a fixed contact of the second vacuum interrupter. Regarding the drive itself this comprises:

an interconnection part;

an actuator;

an operating rod; and a lever system.

The interconnection part is configured to be in electrical connection with a movable contact of the first vacuum interrupter and the interconnection part is configured to be in electrical connection with a movable contact of the second vacuum interrupter. The interconnection part is configured to provide a current path between the movable contacts. A first end of a first non-linear lever arm of the lever system is configured to couple to a pushrod of the movable contact of the first vacuum interrupter at a first lever arm first end pivot point, and a second end of the first lever arm is coupled to the operating rod at a center pivot point. A first end of a second non-linear lever arm of the lever system is configured to couple to a pushrod of the movable contact of the second vacuum interrupter at a second lever arm first end pivot point, and a second end of the second lever arm is coupled to the operating rod at the center pivot point. A first sliding part at the first end of the first non-linear lever arm is supported by the interconnection part and can slide linearly within a slot of the interconnection part or a first sliding part at the first end of the first non-linear lever arm is supported by the interconnection part and can move linearly with respect to a bearing of the interconnection part. A second sliding part at the first end of the second non-linear lever arm is supported by the interconnection part and can slide linearly within a slot of the interconnection part or a second sliding part at the first end of the second non-linear lever arm is supported by the interconnection part and can move linearly with respect to a bearing of the interconnection part. In a first transition the actuator is configured to move the operating rod in a first direction to move the second end of the first lever arm and the second end of the second lever arm such that the first sliding part at the first end of the first lever arm and the second sliding part at the first end of the second lever arm move simultaneously within their corresponding slots away from one another or with respect to their corresponding bearings away from one another. In a second transition the actuator is configured to move the operating rod in a second direction opposite to the first direction to move the second end of the first non-linear lever arm and the second end of the second non-linear lever arm such that the first sliding part at the first end of the first non-linear lever arm and the second sliding part at the first end of the second non-linear lever arm move simultaneously within their corresponding slots towards one another or with respect to their corresponding bearings towards one another.

In an example, the first non-linear lever arm comprises a first arm part connected to a second arm part. The first arm part of the first non-linear lever arm is angled to the second arm part of the first non-linear lever arm. An end of the first arm part is the first end of the first non-linear lever arm coupled to the pushrod of the movable contact of the first vacuum interrupter at the first lever arm first end pivot point.

An end of the second arm part is the second end of the first lever arm coupled to the operating rod at the center pivot point.

In an example, the second non-linear lever arm comprises a first arm part connected to a second arm part. The first arm part of the second non-linear lever arm is angled to the second arm part of the second non-linear lever arm. An end of the first arm part is the first end of the second non-linear lever arm coupled to the pushrod of the movable contact of the second vacuum interrupter at the second lever arm first end pivot point. An end of the second arm part is the second end of the second lever arm coupled to the operating rod at the center pivot point.

In an example, a length of the first arm part of the first non-linear lever arm between the first end pivot point and the connection with the second arm part of the first non-linear lever arm is less than a length of the second arm part of the first non-linear lever arm between the center pivot point and the connection with the first arm part of the first non-linear lever arm.

In an example, a length of the first arm part of the second non-linear lever arm between the first end pivot point and the connection with the second arm part of the second non-linear lever arm is less than a length of the second arm part of the second non-linear lever arm between the center pivot point and the connection with the first arm part of the second non-linear lever arm.

In an example, the first arm part of the first non-linear lever arm is angled to the second arm part of the first non-linear lever arm at an obtuse angle. In an example, the first arm part of the second non-linear lever arm is angled to the second arm part of the second non-linear lever arm at an obtuse angle. In an example, the first arm part of the first non-linear lever arm is angled to the second arm part of the first non-linear lever arm at an angle substantially equal to 90 degrees. In an example, the first arm part of the second non-linear lever arm is angled to the second arm part of the second non-linear lever arm at an angle substantially equal to 90 degrees. In an example, the second non-linear lever arm is a mirror image of the first non-linear lever arm. In an example, the second non-linear lever arm is not a mirror image of the first non-linear lever arm. In a third aspect, there is provided a medium voltage or high voltage switchgear comprising at least one circuit breaker according to the first aspect.

Thus, a design is provided with an interconnection part, which as part of a drive, and the interconnecting part is a part interconnecting two vacuum interrupters (VIs) that are electrically connected in series. This interconnection part interconnecting the two VIs is designed not only for current carrying functionality, but at the same time provides for improved heat exchange and provides for mechanical fixation of the movable parts like current carrying flexible part or sliding current connection to the movable contacts. Also, the interconnecting part and provides for support means for a lever system that is used to move the movable contacts, and where the lever system uses non-linear lever arms to reduce the required stroke of an operating rod and reduce the size of the circuit breaker. The circuit breaker with the drive can be manufactured in this way, and also two existing vacuum interrupters can be coupled together by the interconnecting part, as part of a new drive, in order to provide for increased voltage capability and/or capability at an existing voltage with faster switching operation in an overall size that is minimized. A new drive design has a lever system that connects the pole actuator with pushrods of the two series connected vacuum interrupters, with non-linear lever arms. Using non-linear lever arms with an "elbow" or "knee" shape provides for a decreasing manipulation space needed to move the operating rod and/or adjust the forces needed for proper operation of the vacuum interrupters. Also, a housing can surround the whole to improve the dielectric withstand between two phases/poles as well as for the higher mechanical strength.

The above aspects and examples will become apparent from and be elucidated with reference to the embodiments described hereinafter.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A medium voltage or high voltage circuit breaker; comprising:

a first terminal;

a second terminal;

a first vacuum interrupter;

a second vacuum interrupter;

an interconnection part;

an actuator;

an operating rod; and a lever system;

wherein the first terminal is electrically connected to a first fixed contact of the first vacuum interrupter, and wherein the second terminal is electrically connected to a second fixed contact of the second vacuum interrupter;

wherein the interconnection part is configured to be in electrical connection with a first movable contact of the first vacuum interrupter and the interconnection part is configured to be in electrical connection with a second movable contact of the second vacuum interrupter, and wherein the interconnection part is configured to provide a current path between the first and second movable contacts;

wherein a first end of a first non-linear lever arm of the lever system is coupled to a pushrod of the first movable contact of the first vacuum interrupter at a first lever arm first end pivot point, and wherein a second end of the first lever arm is coupled to the operating rod at a center pivot point, and a length (a) of a first arm part of the first non-linear lever arm between a first end pivot point connected to the pushrod of the first movable contact and a connection to a second arm part of the first non-linear lever arm is less than length of the second arm part of the first non-linear lever arm between the connection to the first arm part and the center pivot point;

wherein a first end of a second non-linear lever arm of the lever system is coupled to a pushrod of the second movable contact of the second vacuum interrupter at a second lever arm first end pivot point, and wherein a second end of the second lever arm is coupled to the operating rod at the center pivot point, and a length (a) of a first arm part of the second non-linear lever arm between a second end pivot point connected to the pushrod of the second movable contact and a connection to a second arm part of the second non-linear lever arm is less than a length (b) of the second arm part between the connection to the first arm part and the center pivot point;

wherein a first sliding part at the first end of the first non-linear lever arm is supported by the interconnection part and can slide linearly within a first sliding support the interconnection part;

wherein a second sliding part at the first end of the second non-linear lever arm is supported by the interconnection part and can slide linearly within second sliding support; and wherein in a transition from an open state to the closed state the actuator is configured to move the operating rod to move the second end of the first non-linear lever arm and the second end of the second non-linear lever arm such that the first sliding part at the first end of the first non-linear lever arm and the second sliding part at the first end of the second non-linear lever arm move simultaneously within their corresponding first and second sliding supports away from one another.

2. The circuit breaker according to claim 1, wherein the first arm part of the first non-linear lever arm is angled to the second arm part of the first non-linear lever arm, wherein an end of the first arm part is the first end of the first non-linear lever arm coupled to the pushrod of the movable contact of the first vacuum interrupter at the first lever arm first end pivot point, and wherein an end of the second arm part is the second end of the first lever arm coupled to the operating rod at the center pivot point; and wherein the first arm part of the second non-linear lever arm is angled to the second arm part of the second non-linear lever arm, wherein an end of the first arm part is the first end of the second non-linear lever arm coupled to the pushrod of the movable contact of the second vacuum interrupter at the second lever arm first end pivot point, and wherein an end of the second arm part is the second end of the second lever arm coupled to the operating rod at the center pivot point.

3. The circuit breaker according to claim 2, wherein the first arm part of the first non-linear lever arm is angled to the second arm part of the first non-linear lever arm at an obtuse angle; and wherein the first arm part of the second non-linear lever arm is angled to the second arm part of the second non-linear lever arm at an obtuse angle.

4. The circuit breaker according to claim 2, wherein the first arm part of the first non-linear lever arm is angled to the second arm part of the first non-linear lever arm at an angle substantially equal to 90 degrees; and wherein the first arm part of the second non-linear lever arm is angled to the second arm part of the second non-linear lever arm at an angle substantially equal to 90 degrees.

5. The circuit breaker according to claim 1, wherein the second non-linear lever arm is a mirror image of the first non-linear lever arm.

6. The circuit breaker according to claim 1, wherein the interconnection part is configured to be in electrical connection with the first movable contact of the first vacuum interrupter and the interconnection part is configured to be in electrical connection with the second movable contact of the second vacuum interrupter during at least part of the transition from the open state to the closed state.

7. The circuit breaker according to claim 1, wherein in a transition from the closed state to the open state the actuator is configured to move the operating rod to move the second end of the first non-linear lever arm and the second end of the second non-linear lever arm such that the first sliding part at the first end of the first non-linear lever arm and the second sliding part at the first end of the second non-linear lever arm move simultaneously within the first and second sliding supports respectively towards one another.

8. The circuit breaker of claim 1, wherein the first sliding support and the second sliding support are one or more of a slot and a sliding bearing included on the interconnection part.

9. A drive for a medium voltage or high voltage circuit breaker, wherein the circuit breaker comprises:

a first terminal, a second terminal, a first vacuum interrupter, and a second vacuum interrupter, wherein the first terminal is electrically connected to a first fixed contact of the first vacuum interrupter, wherein the second terminal is electrically connected to a second fixed contact of the second vacuum interrupter; and wherein the drive comprises:

an interconnection part;

an actuator;

an operating rod; and a lever system;

wherein the interconnection part is configured to be in electrical connection with a first movable contact of the first vacuum interrupter and the interconnection part is configured to be in electrical connection with a second movable contact of the second vacuum interrupter, and wherein the interconnection part is configured to provide a current path between the first and second movable contacts;

wherein a first end of a first non-linear lever arm of the lever system is configured to couple to a pushrod of the first movable contact of the first vacuum interrupter at a first lever arm first end pivot point, and wherein a second end of the first lever arm is coupled to the operating rod at a center pivot point, and a length (a) of a first arm part of the first non-linear lever arm between the first end coupled to the pushrod of the first moveable contact and a connection to a second arm part is less than a length (b) of the second arm part between the connection to the first arm part and the second end of the first lever arm coupled to the center pivot point;

wherein a first end of a second non-linear lever arm of the lever system is configured to couple to a pushrod of the second movable contact of the second vacuum interrupter at a second lever arm first end pivot point, and wherein a second end of the second lever arm is coupled to the operating rod at the center pivot point, and a length (a) of a first arm part of the second non-linear lever arm between the first end coupled to the pushrod of the second moveable contact and a connection to a second arm part is less than a length (b) of the second arm part between the connection to the first arm part and the second end of the second lever arm coupled to the center pivot point;

wherein a first sliding part at the first end of the first non-linear lever arm is supported by the interconnection part and can slide linearly within a first sliding support of the interconnection part;

wherein a second sliding part at the first end of the second non-linear lever arm is supported by the interconnection part and can slide linearly within a second sliding support of the interconnection part;

wherein in a first transition the actuator is configured to move the operating rod in a first direction to move the second end of the first lever arm and the second end of the second lever arm such that the first sliding part at the first end of the first lever arm and the second sliding part at the first end of the second lever arm move simultaneously within the first and second sliding supports respectively away from one another; and wherein in a second transition the actuator is configured to move the operating rod in a second direction opposite to the first direction to move the second end of the first non-linear lever arm and the second end of the second non-linear lever arm such that the first sliding part at the first end of the first non-linear lever arm and the second sliding part at the first end of the second non-linear lever arm move simultaneously within the first and second sliding supports respectively towards one another.

10. The drive according to claim 9, wherein the first arm part of the first non-linear lever arm is angled to the second arm part of the first non-linear lever arm, wherein an end of the first arm part is the first end of the first non-linear lever arm coupled to the pushrod of the movable contact of the first vacuum interrupter at the first lever arm first end pivot point, and wherein an end of the second arm part is the second end of the first lever arm coupled to the operating rod at the center pivot point; and wherein the first arm part of the second non-linear lever arm is angled to the second arm part of the second non-linear lever arm, wherein an end of the first arm part is the first end of the second non-linear lever arm coupled to the pushrod of the movable contact of the second vacuum interrupter at the second lever arm first end pivot point, and wherein an end of the second arm part is the second end of the second lever arm coupled to the operating rod at the center pivot point.

11. The drive according to claim 10, wherein the first arm part of the first non-linear lever arm is angled to the second arm part of the first non-linear lever arm at an obtuse angle; and wherein the first arm part of the second non-linear lever arm is angled to the second arm part of the second non-linear lever arm at an obtuse angle.

12. The drive according to claim 10, wherein the first arm part of the first non-linear lever arm is angled to the second arm part of the first non-linear lever arm at an angle substantially equal to 90 degrees; and wherein the first arm part of the second non-linear lever arm is angled to the second arm part of the second non-linear lever arm at an angle substantially equal to 90 degrees.

13. The drive according to claim 9, wherein the second non-linear lever arm is a mirror image of the first non-linear lever arm.

* * * * *